No. 799,268. PATENTED SEPT. 12, 1905.
H. C. RICHMOND.
TEDDER.
APPLICATION FILED FEB. 21, 1905.
2 SHEETS—SHEET 2.
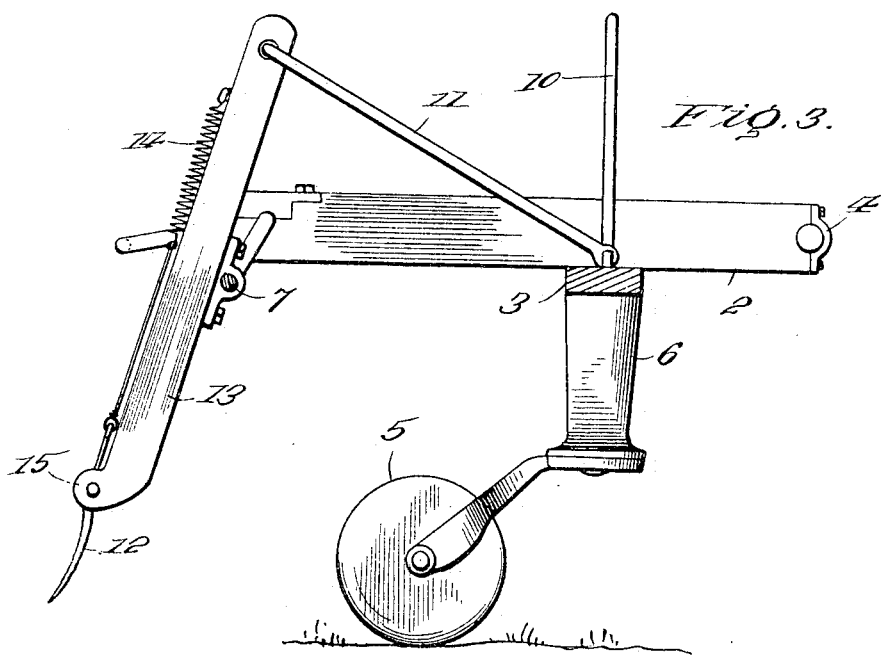
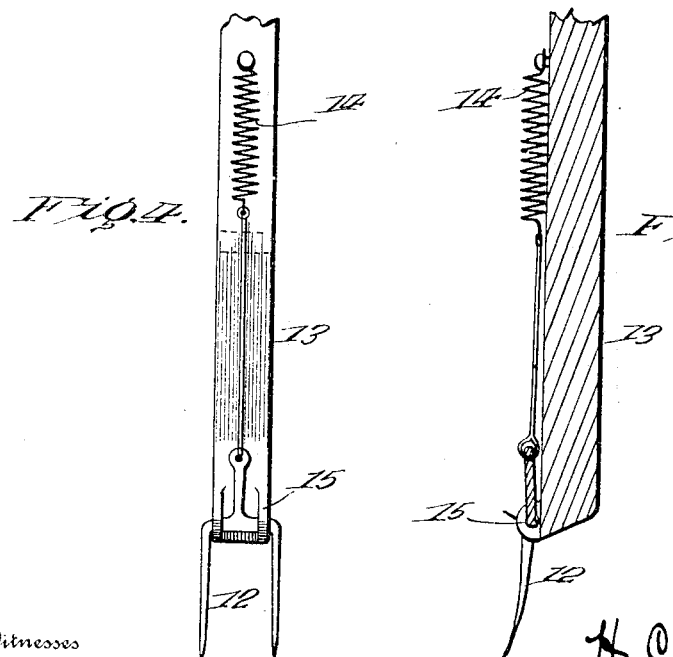

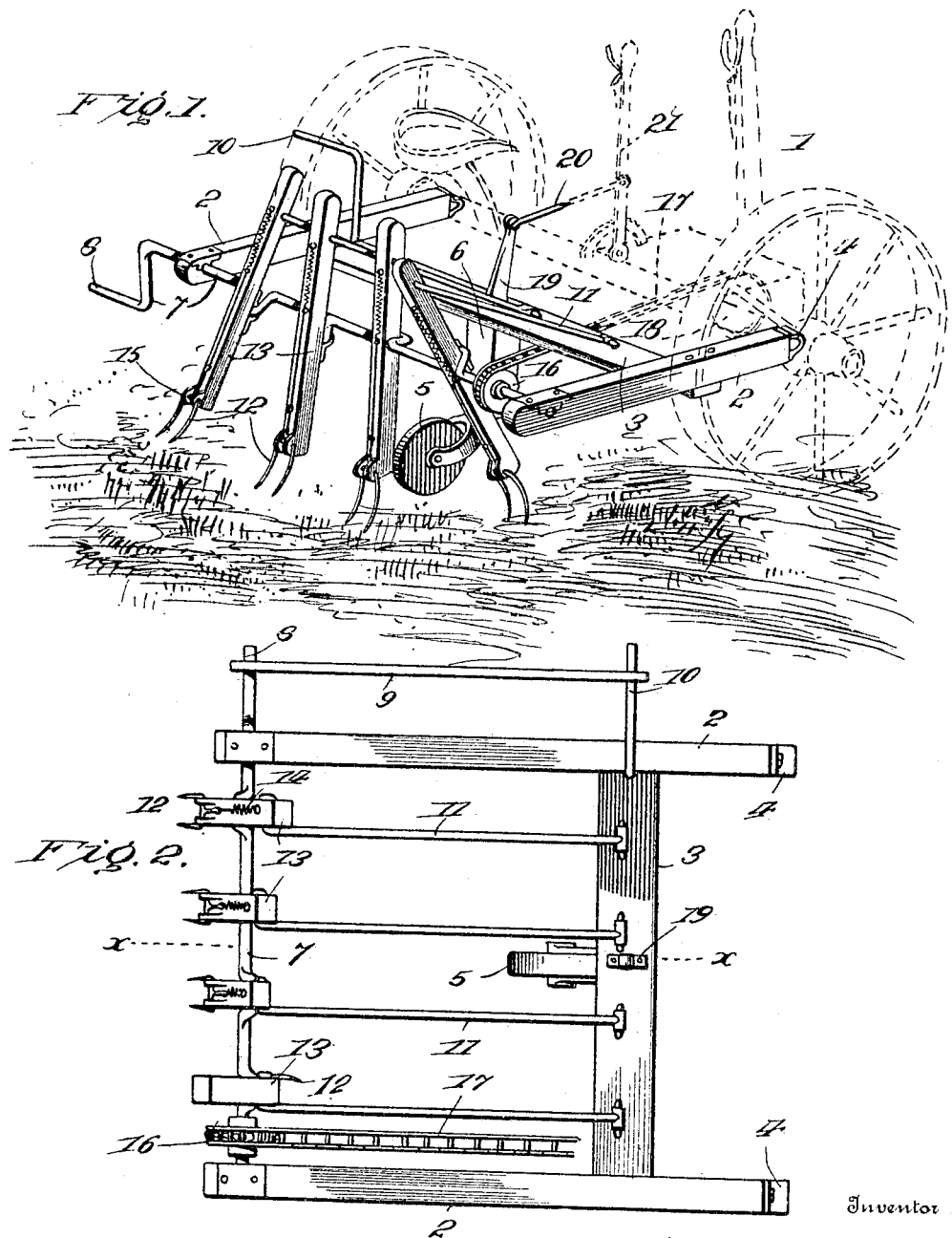

UNITED STATES PATENT OFFICE.

HARRY C. RICHMOND, OF CAMERON, WEST VIRGINIA.

TEDDER.

No. 799,268.      Specification of Letters Patent.      Patented Sept. 12, 1905.

Application filed February 21, 1905. Serial No. 246,698.

*To all whom it may concern:*

Be it known that I, HARRY C. RICHMOND, a citizen of the United States, residing at Cameron, in the county of Marshall and State of West Virginia, have invented certain new and useful Improvements in Tedders, of which the following is a specification.

This invention has for its object to devise a novel form of tedder adapted for use in connection with reapers and mowers for spreading hay or grain simultaneously with the cutting operation, thereby saving time and labor.

The invention is in the nature of an attachment and is adapted to be readily coupled to and disconnected from a mower or reaper, thereby admitting of the implement being used solely for cutting grain when so required or for spreading the grain when cutting the same should it be required to cure the same in the field in the well-known manner.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which—

Figure 1 is a perspective view showing a tedder connected in accordance with this invention as it will appear when applied to a mower or reaper of ordinary construction. Fig. 2 is a top plan view of the tedder. Fig. 3 is a longitudinal section of the tedder on the line $x$ $x$ of Fig. 2, the remote kicker and coöperating parts being omitted. Figs. 4 and 5 are respectively a front view and a vertical section of a kicker embodying the invention, the upper portion being broken away.

Corresponding and like parts are referred to in the following description and indicated in all the views of the drawings by the same reference characters.

The numeral 1 indicates a mower or reaper of ordinary construction and is illustrated simply to demonstrate the application of the invention.

The tedder comprises longitudinal bars 2 and a connecting cross-bar 3, the latter forming a substantial framework for supporting the operating parts. The front ends of the bars 2 are provided with couplings 4 of any structural type for loosely connecting the tedder to the axle or other convenient part of the mower or reaper. A caster-wheel 5 of any structural type supports the tedder and is fitted to a post 6 or kindred part pendent from the cross-bar 3. A compound crank-shaft 7 is journaled in bearings at the rear ends of the longitudinal bars 2, and its crank portions are set at different angles to admit of the kickers coming into play in successive order. An end portion of the crank-shaft 7 is extended and terminates in a crank-arm 8, which in conjunction with a rod or bar 9 and a standard 10 holds the crank-shaft and kickers stationary when the attachment is lifted so as to clear the ground.

A series of kickers are mounted upon the crank portions of the crank-shaft 7, and their upper ends are connected by rods 11 to the cross-bar 3. Each of the kickers is similarly constructed and comprises a pivoted fork 12, supporting-bar 13, and tension-spring 14. The bars 13 are mounted between their ends upon the respective crank portions of the shaft 7, and their lower ends have rear extensions 15, to which the forks 12 are pivoted, the upper ends or shanks of the forks lying against the bars 13 and braced thereby. The springs 14 have connection with the upper ends of the fork-shanks to hold the forks in working position under normal conditions and admit of their yielding when meeting with an obstruction, so as to clear the same without straining or otherwise disabling the machine.

When in service, the shaft 7 has a rotary motion imparted thereto, and for this purpose a sprocket-wheel 16, fast thereto, is connected by sprocket-chain 17 with a sprocket-wheel 18, fast to the axle or other rotating part of the mower or reaper. The sprocket-wheel 18 is in axial alinement with the pivotal connection of the tedder attachment of the mower or reaper, so as to admit of raising and lowering said attachment without varying the tension of the sprocket-chain 17. For convenience of raising and lowering the attachment a standard 19 is projected upward from the cross-bar 3 and is connected, by means of a rod or bar 20, with a lever 21, provided upon the mower or reaper and extended within convenient reach of the driver's seat, whereby the tedder may be raised or lowered without necessitating dismounting of the driver.

In accordance with this invention a tedder attachment embodying the novel features set forth is coupled to a mower or reaper in such a manner as to admit of its being raised or lowered by means of the lever 21 and of rotary motion being applied to the shaft 7 from the axle or other rotating part of the machine. As the mower or like implement is drawn over the field and the grain is cut the forks of the kickers pick up the grain and scatter the same in the well-known manner to admit of air and light reaching every part for thorough and effective curing. When desired, a rod or bar 9 may connect the crank-arm 8 with the standard 10, so as to hold the kickers stationary when not in service. Obviously when the connection 9 is in position the driving mechanism of the shaft 7 must be thrown out of action either by unshipping the drive-chain 17 or by throwing one or the other of the sprocket-wheels 16 or 18 out of action, which may be effected in any of the usual ways.

Having thus described the invention, what is claimed as new is—

A tedder attachment for mowers and like implements, the same comprising a framework provided with coupling means, kickers, actuating means for operating the kickers from a positively-driven part of the mower comprising a compound crank-shaft having an end extended and provided with a crank-arm; a lever mounted upon the mower and under control of the driver and connected with the framework of the attachment to admit of raising and lowering the latter, a standard projected from the framework of the attachment, and a bar for connecting the standard and the aforesaid crank-arm to hold the tedder mechanism out of action when the said tedder attachment is elevated, substantially as set forth.

In testimony whereof I affix my signature in presence of two witnesses.

HARRY C. RICHMOND. [L. S.]

Witnesses:
J. E. MASON,
S. W. McCARDLE.